United States Patent [19]

Kocher

[11] Patent Number: 4,567,815
[45] Date of Patent: Feb. 4, 1986

[54] CONNECTING ROD AND BEARING ASSEMBLY THEREFOR

[75] Inventor: Erich J. Kocher, Milwaukee, Wis.

[73] Assignee: Vilter Manufacturing Corporation, Milwaukee, Wis.

[21] Appl. No.: 677,930

[22] Filed: Dec. 4, 1984

[51] Int. Cl.4 ............... F01B 31/10; F16C 33/10
[52] U.S. Cl. .................................. 92/261; 92/157; 92/DIG. 1; 384/291
[58] Field of Search ............... 92/DIG. 2, 261, 157, 92/DIG. 1; 384/291

[56] References Cited

U.S. PATENT DOCUMENTS

| | | | |
|---|---|---|---|
| 2,289,233 | 7/1942 | Beall et al. | 384/291 |
| 2,822,222 | 2/1958 | Love | 384/291 |
| 2,940,802 | 6/1960 | Love | 384/291 |
| 3,131,785 | 5/1964 | Blank | 384/291 |
| 4,423,667 | 1/1984 | Hayashi | 384/291 |

*Primary Examiner*—Paul E. Maslousky
*Attorney, Agent, or Firm*—James E. Nilles; Thomas F. Kirby

[57] ABSTRACT

A refrigeration gas compressor comprises a piston reciprocably movable to effect gas compression, a motor-driven rotatable crank shaft, and a connecting rod between a crank shaft, crank pin and a piston wrist pin. A crank pin receiving hole and a wrist pin receiving hole in the connecting rod are connected by an oil passage. The crank pin has two lubricating oil supply ports at opposite sides of its outer surface through which lubricating oil is pumped. A bearing assembly comprising semi-circular upper and lower bearing sections is disposed around the crank pin. The upper bearing section has wedge-shaped oil well recesses at opposite ends of its inner surface which receive oil from the oil supply ports. The upper bearing section also has two oil feed holes therethrough for supplying oil from the wells to a groove in the crank pin hole side wall adjacent the upper bearing section. A circumferentially extending groove in the inner surface of the lower bearing section receives oil from the oil supply ports and communicates with the oil well recesses. The rotational upward compression stroke of the crank pin causes oil to be drawn toward the narrow end of one wedge-shaped recess to effect high pressure hydrodynamic lubrication in the load bearing zone between the upper bearing section and the crank pin. Oil also flows at pump pressure from the oil well recesses through the other flow paths.

5 Claims, 16 Drawing Figures

CONNECTING ROD AND BEARING ASSEMBLY THEREFOR

BACKGROUND OF THE INVENTION

1. Field of Use

This invention relates generally to a connecting rod in the drive connection between a crank shaft and a piston in a gas compressor or the like.

In particular, it relates to the construction of the crank pin on the crank shaft and to the construction of a two-piece bearing assembly employed in a crank pin receiving hole in the connecting rod.

2. Description of the Prior Art

Some machines, such as reciprocating type internal combustion (IC) engines and gas compressors or the like, employ a rotatable crank shaft, a reciprocably movable piston and a connecting rod which transmits motion therebetween. Typically, the connecting rod has a cylindrical crank pin hole at one end for receiving a cylindrical crank pin of the crank shaft and a wrist pin hole at the opposite end for receiving the wrist pin of the piston. When the system is in operation, the crank shaft rotates, the crank pin travels in a circular path and also exhibits oscillatory motion relative to the crank pin hole and the connecting rod and piston exhibit generally reciprocating motion. Usually, a one or two-piece friction-reducing bearing assembly is employed in the crank pin hole of the connecting rod around the crank pin and lubricating oil is supplied thereto under pressure from a pump through passages in the crank pin. In an IC engine, reciprocating movement of the piston and connecting rod on a power stroke effects rotation of the crank shaft. In a two-cycle IC engine there is one power/intake stroke and one compression/exhaust stroke of the connecting rod for each revolution of the crank shaft. In a four-cycle IC engine there is one power/intake stroke or one compression/exhaust stroke of the connecting rod for each crank shaft revolution. Conversely, in a compressor, rotational movement of the crank shaft (imparted by a motor) effects reciprocating movement of the connecting rod and piston. In a typical two-cycle compressor there is one compression stroke and one intake stroke of the connecting rod for each revolution of the crank shaft. In both an IC engine and a compressor, maximum force or pressure is applied to the side of the crank pin closest to the piston during the power stroke and during the compression stroke and this side of the crank pin tends to exhibit the most wear. The pressure is applied either by an adjacent side of the crank pin hole or by the bearing therearound. The compressive and wear forces acting on the crank pin and its bearing in a large compressor are often substantially higher and of greater frequency than those in a comparably sized four-cycle IC engine. Furthermore, since the lubricating oil temperature in an IC engine is much higher than that in a compressor, oil in the compressor is more viscous, (assuming oil of the same type and weight) and lubrication can pose problems, especially between two metal surfaces which are being forced together at great pressure on the order of 1000 psi.

Some prior art friction-reducing bearing assemblies for the connecting rod in the compressor comprise two semi-circular bearing sections disposed around the crank pin in the crank pin hole in the connecting rod. Typically, the prior art semicircular bearing sections are identical to each other and each is provided on its inside surface with at least one circumferentially extending oil feed groove which confronts the crank pin surface. Lubricating oil is fed (at relatively low pressure on the order of 40 psi) through a passage in the crank pin to the oil feed grooves. During operation of the compressor, the crank pin, the connecting rod and the piston move in one direction to effect a gas compression stroke and then move in the opposite direction to effect a suction or return stroke. In the course of the compression stroke, one of the semi-circular bearing sections (i.e., that closest to the piston and typically the "upper" section) is subjected to severe compression forces or load (on the order of 1000 psi) as the driven crank pin moves thereagainst while the gas being compressed resists the corresponding motion of the piston and connecting rod. However, on the return stroke the force on the said one ("upper") bearing section is relieved and only nominal compression force is exerted on the other semi-circular bearing section (i.e., that farthest from the piston and typically the "lower" section). Thus, such severe compressive forces on the "upper" bearing section are frequently repeated and inhibit adequate lubrication during the compression stroke. This eventually results in wear on the inner bearing surface and on the crank pin surface confronting the inner bearing surface of the "upper" bearing section. If the inner surface is grooved, there is eventual formation of a ridge on that ("upper") portion of the crank pin surface confronting the oil feed groove where no such wear occurs. Although elimination of the oil feed groove from the "upper" bearing section would prevent formation of the aforesaid ridge on the crank pin surface, there would also be a substantial loss of direct oil flow to the inside surface of the bearing section and to the confronting crank pin surface and other forms of bearing damage would occur. Since operating temperatures and lubricating oil temperatures in a compressor are typically on the order of 120° F. (and substantially lower than those in an IC engine), the flow of lubricating oil is comparatively slow or sluggish. Furthermore, since oil is supplied to the bearing assembly at a pressure of about 40 psi, but the heavy compressive forces acting on an ungrooved bearing section are on the order of 1000 psi, the force tends to prevent entry of oil between the bearing section and the crank pin thereby causing greater friction, wear and deformation. Deformation of the crank pin surface and poor lubrication combine to further aggravate and accellerate bearing wear and necessitate costly bearing replacement.

Various types of bearing assemblies have been proposed to overcome lubrication, wear and other problems in various forms of equipment. The following U.S. Pat. Nos. illustrate the state of the art: 3,131,785 Blank 2,566,080 Davids 2,956,642 Chaplin 2,544,913 Brantingham 2,901,297 Sternlicht 2,539,072 Gordon 2,631,905 Coppen 2,289,233 Beall 2,616,771 Metzgar 1,948,340 Dolza 1,947,023 Shoemaker 1,300,023 Riegel However, none of these patents disclose a construction, mode of operation or solution which is the same as or as effective as that of the present invention.

SUMMARY OF THE PRESENT INVENTION

In accordance with the present invention, there is provided an improved crank pin, connecting rod and bearing assembly therefor which are especially well-adapted for use in apparatus such as a refrigeration compressor or the like.

The connecting rod comprises a wrist pin hole at one end and a cylindrical crank pin hole at its other end. The upper surface of the crank pin hole is provided with an oil receiving groove which communicates with an oil passage extending through the connecting rod to the wrist pin hole. The crank pin hole in the connecting rod is adapted to receive the crank pin and the connecting rod bearing assembly disposed therearound. The crank pin comprises a first oil passage which extend axially therethrough a second oil passage which extends transversely through the crank pin and communicates with the first oil passage.

The connecting rod bearing assembly comprises two (upper and lower) semi-circular bearing sections. The upper bearing section has a smooth inner bearing surface with two oil well recesses formed therein at opposite ends thereof and has two oil feed holes extending therethrough, one near each of the oil well recesses. The lower bearing section has an inner bearing surface with an oil-receiving groove formed in and circumferentially extending along its inner surface between opposite ends of the lower bearing section. The ends of the groove in the lower bearing section communicate with the oil well recesses in the upper bearing section.

During operation, the upper bearing section and the confronting crank pin surface are subjected to heavy loads on each upward compression stroke of the crank pin. However, the overall construction of the connecting rod, crank pin and connecting rod bearing assembly avoids wear on the crank pin and bearing assembly by providing hydrodynamic lubrication of the bearing assembly. Lubricating oil is fed under pressure through the first and second passages in the crank pin and is expelled from opposite ends of the second passage. Depending on the position of the crankpin relative to the bearing assembly, oil flows directly to the two oil well recesses in the upper section or to the groove in the lower bearing section and thence to the oil well recesses. From these recesses oil flows to the groove in the lower section and through the two oil feed holes in the upper bearing section. Oil flows through the two oil feed holes to the oil receiving groove in the connecting rod and from thence through the associated oil passage to the wrist pin hole.

On the compression stroke oil is drawn from one of the two oil well recesses in the upper bearing section hydrodynamically, as hereinafter explained, between the smooth inside load-bearing surface of the upper bearing section and the confronting surface of the crank pin. Oil also is forced from the groove in the lower bearing section between the two smooth inside load bearing surfaces of the lower bearing section and the crank pin.

Unlike connecting rod and bearing assemblies used in four-cycle high-temperature IC engines, the connecting rod and the bearing assembly therefor in accordance with the invention is well-adapted for use in a relatively cool two-cycle refrigerator compressor, wherein one (the "upper") bearing section is more frequently subjected to heavy loads on each compression stroke, and the overall construction avoids wear and permits hydrodynamic lubrication using more viscous lubricating oil. The ungrooved inner bearing surface of the upper bearing section utilizes the full crank pin surface thereby improving its load bearing capacity. Furthermore, the wells on the one (upper) section enable use and flow of more viscous lubricating oil at higher pressure for hydrodynamic lubrication. An uninterrupted bearing surface can support a greater load than a grooved bearing surface of comparable size when hydrodynamic lubrication is achieved and, under this condition, the bearing surface and mating crank pin surface are actually separated by an oil film and no wear occurs.

The bearing construction and arrangement is such that positive lubrication is obtained with the crankshaft operating in either direction of rotation. Symmetry is obtained by having wells at each end of the upper bearing section which are continuously supplied with oil from the groove in the lower bearing section which is in communication at all times with the transverse oil passage in the crank pin.

With respect to the prior art patents hereinbefore referred to, none show the present invention.

Other objects and advantages of the present invention will hereinafter appear.

DRAWINGS

DESCRIPTION OF A PREFERRED EMBODIMENT

Figure 1:
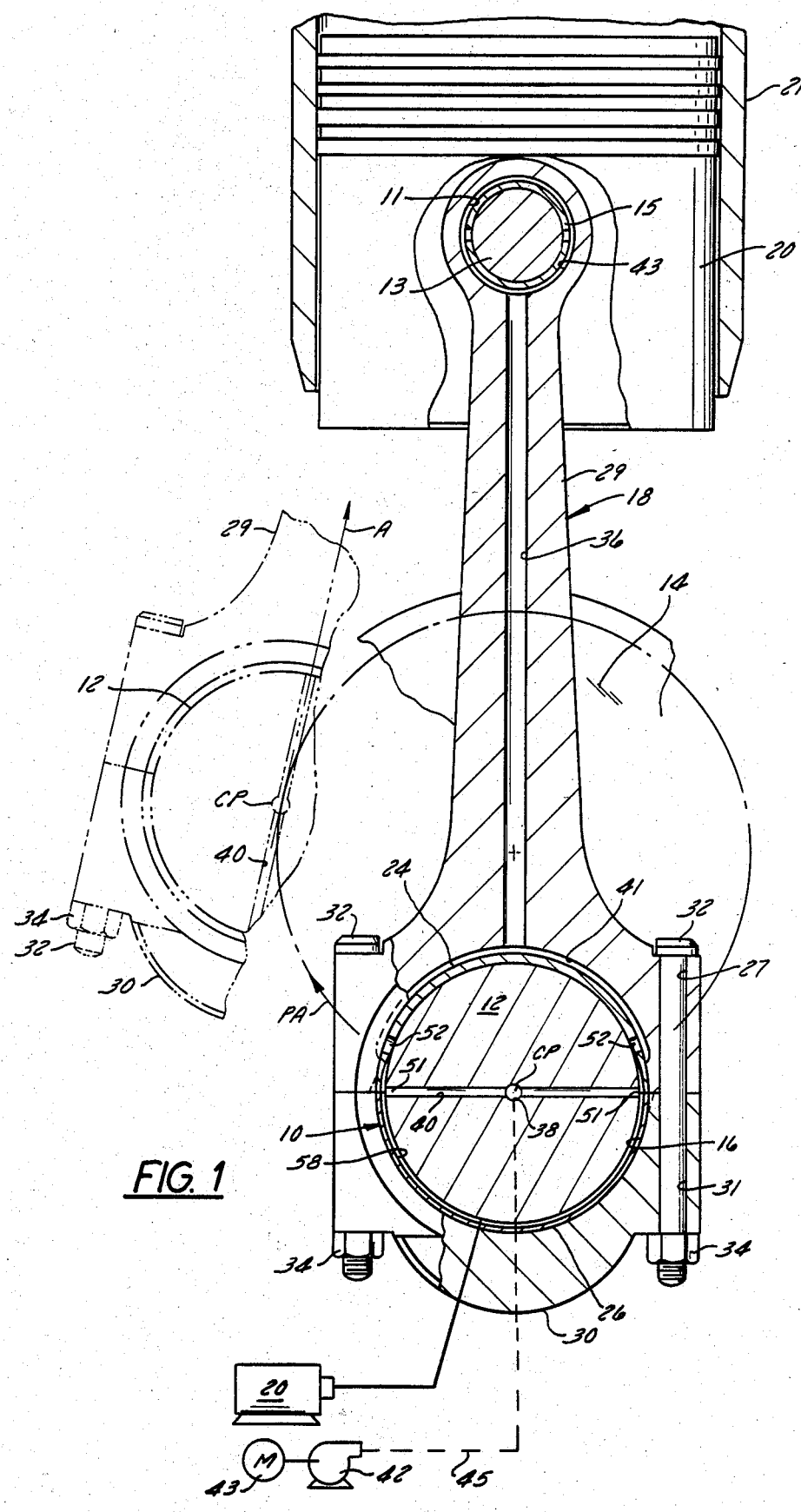
FIG. 1 is a front elevation view, partly in cross section, showing a connecting rod and bearing assembly therefor in accordance with the invention in association with a crank shaft crank pin and piston wrist pin of a refrigeration compressor.
Figure 2:
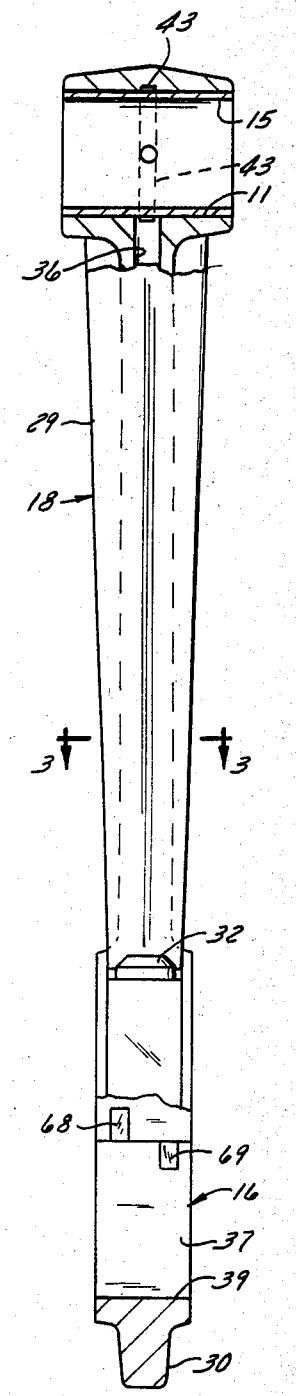
FIG. 2 is a side elevation view, partly in cross section, of the connecting rod and bearing assembly of FIG. 1.
Figure 3:
FIG. 3 is a cross section view of the connecting rod taken on line 3—3 of FIG. 2.

Referring to FIG. 1, there is shown a portion of a machine, such as a reciprocating type gas compressor or the like including a rotatable crank shaft 14, a piston 20, reciprocably movable in a cylinder 21, and a connecting rod 18 connected between the crank shaft and piston to transmit motion therebetween.

Crank shaft 14 has a cylindrical crank pin 12 thereon. Piston 20 has a cylindrical wristpin 13 therein. Connecting rod 18 has a cylindrical wristpin hole 11 at its upper end for receiving wristpin 13 and a cylindrical bearing or bushing 15 therearound. Connecting rod 18 also has a cylindrical crank pin hole 16 at its lower end for receiving crank pin 12. An anti-friction bearing assembly 10 is disposed in hole 16 around crank pin 12 and generally comprises an upper section 24 and a lower section 26.

Crank shaft 14 is rotatably driven by an electric motor 20. Crank shaft 14 can be driven for rotation in either direction, depending on the compressor installation, but is shown herein as being driven so that the centerpoint CP of the crank pin 12 thereon traces a clockwise (in FIG. 1) circular path PA to impart reciprocating vertical motion to connecting rod 18 and piston 20. On each upstroke or compression stroke in the direction of Arrow A, piston 20 effects compression and eventual exhausting of refrigerant gas out of cylinder 21. On each downstroke, piston 20 draws uncompressed gas into cylinder 21. Thus, on each upstroke, piston 20 is working against a relatively large load and the upper side of crank pin 12 exerts a relatively large force toward the upper section 24 of bearing assembly 10 and toward the upper side wall of the crank pin hole 16. This force is substantially greater than that exerted by the lower side of crank pin 12 toward the lower section 26 of bearing assembly 10 and the lower side wall of crank pin hole 16 during a return or suction stroke of piston 20. A pump 42 driven by an electric motor 43 is provided to supply lubricating oil through an oil supply line 45 to lubricate bearing assembly 10 and wristpin bearing 15, as hereinafter explained.

Figure 6:
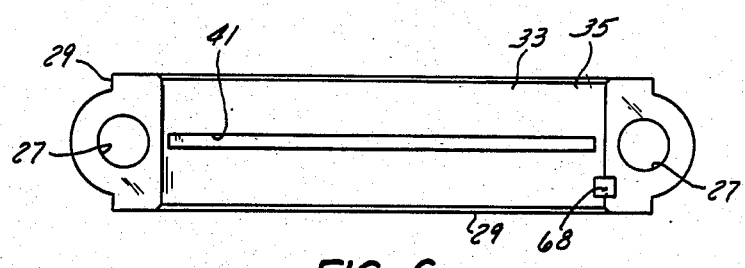
FIG. 6 is an elevation view taken on parting line 6—6 of FIG. 4 and showing the inside wall of the semi-circular opening at the lower end of the elongated section of the connecting rod.

As FIGS. 1, 2, 3, 4, 5 and 6 show, connecting rod 18 comprises an elongated main portion 29 and an end cap portion 30 which is secured to main portion 29 by a pair of bolts 32, each of which is provided with a nut 34. Each bolt 32 extends through aligned holes 27 and 31 in flanges formed on connecting rod portions 29 and 30, respectively. Main portion 29 of connecting rod 18 is provided at its lower end with a semi-circular recess 33 defined by a wall 35. Cap portion 30 is provided at its lower end with a semi-circular recess 37 defined by a wall 39. When main portion 29 and cap portion 30 of connecting rod 18 are assembled, the semi-circular recesses 33 and 37 cooperate to define cylindrical crank pin receiving hole 16. As FIG. 6 shows, wall 35 of main portion 29 of connecting rod 18 is provided with an oil receiving groove or recess 41 which extends therealong intermediate the opposite ends of wall 35. The wall defining wristpin hole 11 in connecting rod 18 is provided with an oil groove 43 which extends circumferentially therearound. Main portion 29 of connecting rod 18 is provided with an oil passage 36 which extends therethrough and communicates between the oil receiving groove 41, and the oil groove 43 in wristpin hole 11.

Figure 7:
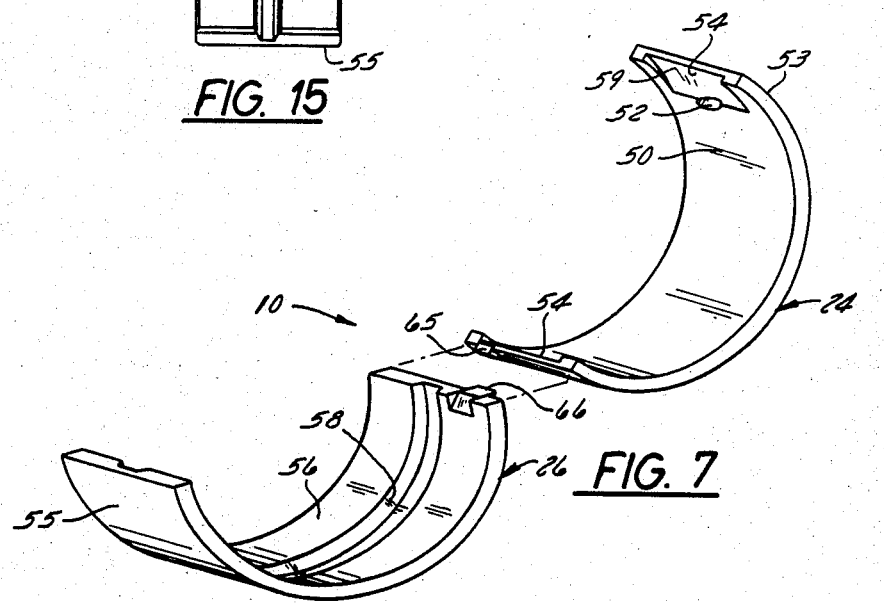
FIG. 7 is a perspective view of the upper and lower bearing sections of the bearing asembly of FIGS. 1, 2 and 4.

The walls 35 and 39 of the semi-circular recesses 33 and 37 of the main portion 29 and end cap portion 30, respectively, of connecting rod 18 are provided with notches or recesses 68 and 69, respectively, which engage tabs 65 and 66 (see FIG. 7), respectively, on the bearing sections 24 and 26, respectively, to hold them in place.

Figure 4:
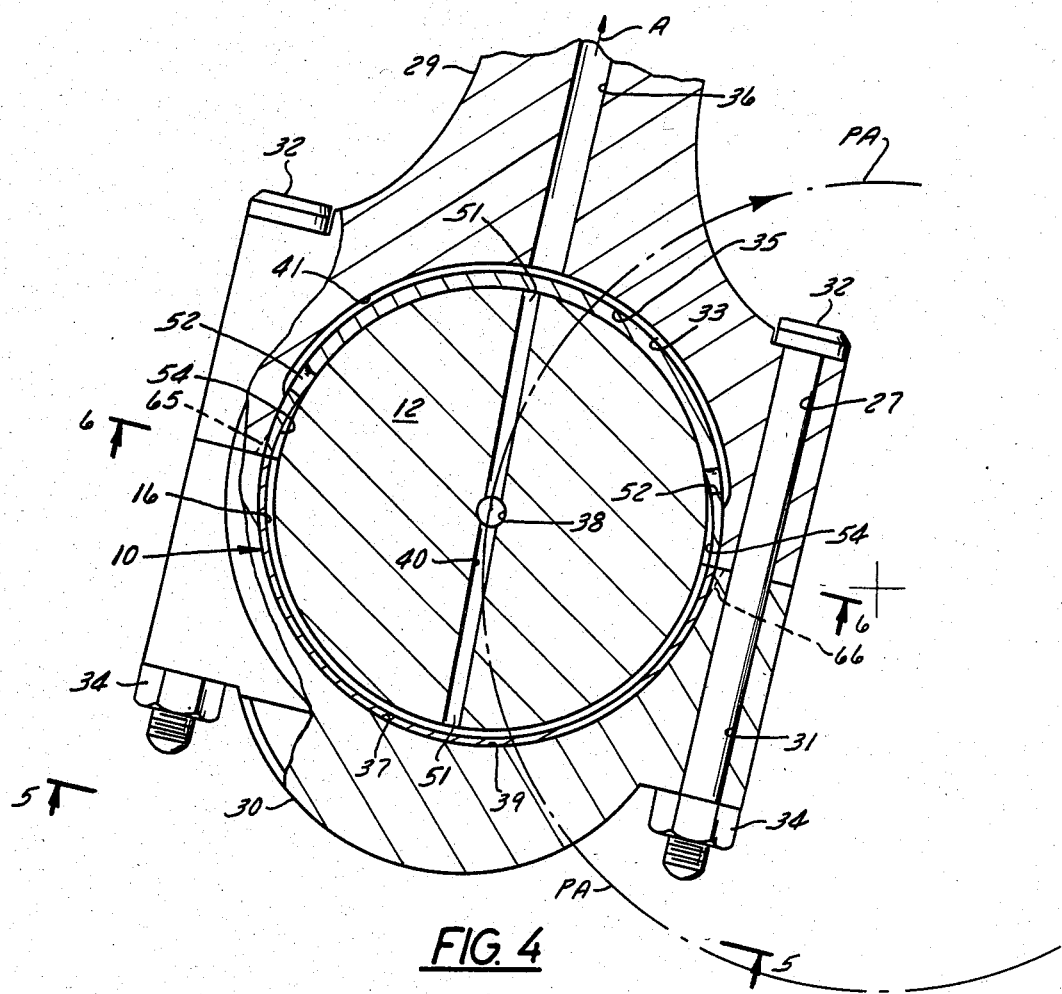
FIG. 4 is a view similar to FIG. 1 but showing the crankshaft crank pin, connecting rod and bearing assembly in another position.
Figure 5:
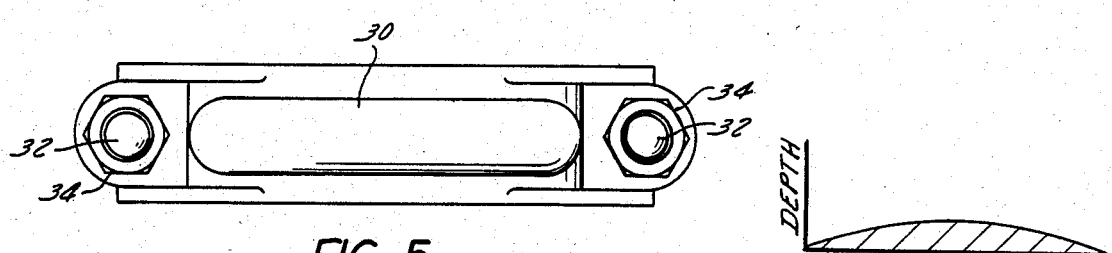
FIG. 5 is an elevation view of the end cap at the lower end of the connecting rod of FIGS. 1, 2 and 4.

As FIGS. 1 and 4 show, crank pin 12 of crank shaft 14 is provided with an oil supply passage 38 which extends axially therethrough along the centerline CP thereof. As will be understood, one end (not shown) of passage 38 is closed and the other end is connected to oil supply line 45 from oil pump 42. Crank pin 12 is also provided with an oil feed passage 40 which extends transversely therethrough and has outlet ports 51 at opposite ends thereof which open on opposite sides of the surfaces of crank pin 12. Oil feed passage 40 communicates with and is supplied by oil supply passage 38.

As FIGS. 7, 10, 11, 12 and 13 show, upper bearing section 24 is generally semi-circular or semi-cylindrical in configuration and comprises a smooth inner bearing surface 50 and a smooth outer surface 53. Section 24 also comprises a pair of oil holes 52 which extend therethrough and a pair of depressions or recesses at opposite ends of inner surface 50 defining two oil wells 54 adjacent the holes 52. While two oil wells 54 are provided, only one will exhibit hydrodynamic lubrication and this depends on the direction of rotation of crank pin 12.

As FIGS. 7, 14, 15 and 16 show, lower bearing section 26 is generally semi-circular or semi-cylindrical in configuration and comprises a smooth inner bearing surface 56 and a smooth outer surface 55. Inner surface 56 has an oil-receiving groove 58 therein which extends between opposite ends of bearing section 26.

Figure 16:
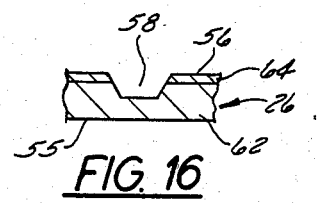
FIG. 16 is a cross-section view taken on line 16—16 of FIG. 15 and showing the oil feeder groove.

Preferably, as FIG. 16 shows, lower bearing section 26 is fabricated of a steel backing portion 62 to which a tin base babbit metal face 64 is bonded to serve as a bearing surface. Upper bearing section 24 is understood to be similarly constructed.

The bearing sections 24 and 26 are provided at one end with outwardly bent integrally formed tabs 65 and 66, respectively, which serve to engage the notches 68 and 69, respectively, in the walls of opening 16 and prevent rotation of the bearing sections relative to the connecting rod 18.

Figure 12:
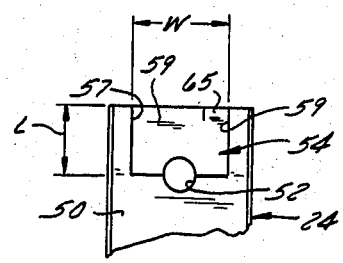
FIG. 12 is an elevation view taken in line 12—12 of FIG. 10 and showing an oil well recess.
Figure 13:
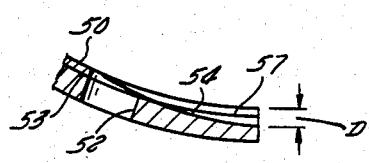
FIG. 13 is an enlarged cross section view taken in line 13—13 of FIG. 11 and showing the wedge-shaped configuration of the oil well recess.
Figure 14:
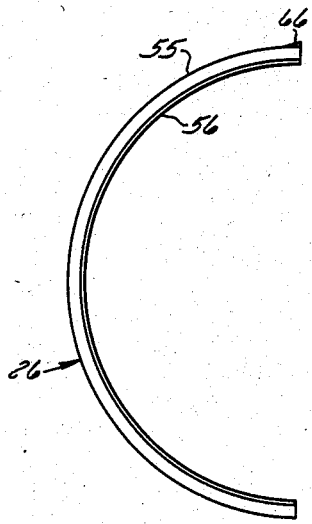
FIG. 14 is an elevation view of one edge of the lower bearing section.
Figure 15:
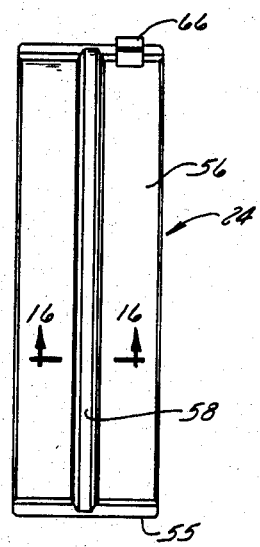
FIG. 15 is an elevation view of the inside surface of the lower bearing section and showing an oil feeder groove therein.

As FIG. 7, 10, 11, 12 and 13 best show, each oil well recess 54 in upper bearing section 24 is tapered or wedge-shaped and is defined by a pair of laterally spaced apart side wall surfaces 57 and a curved bottom wall surface 59. Recess 54 is open at the end thereof adjacent the associated end of bearing section 24 and diminishes in depth proceeding in a direction from its open end toward the center of the bearing section. For convenience in discussion and as FIGS. 12 and 13 show, recess 54 has a predetermined width W (FIG. 12), a predetermined length L (FIG. 12), and a predetermined depth D (FIG. 13) which diminishes as above-mentioned. Preferably, the width W of recess 54 should be as great as is practical relative to the width of bearing section 24. Oil hole 52 intersects oil well recess 54 near the shallow inner end thereof. The space on surface 50 between the two oil well recesses 54 is a load-bearing surface or zone which engages the load-bearing surface of crank pin 12.

Operation of the system is as follows. Assume that the components thus far described are arranged as shown in FIG. 1, and that they are in motion but momentarily at the extreme bottom of a downstroke as shown in FIG. 1. Oil is being supplied axial oil supply passage 38 and through transverse oil feed passage 40 in crank pin 12 to the ports 51. Oil flows from each port 51 directly into its associated oil well recess 54 and from there it follows three separate paths. First, oil flows directly from the open end of oil well recess 54 into an associated open end of oil-receiving groove 58 in lower bearing section 26 thereby filling groove 58 and from thence to the space between the smooth inner surface 56 and lower bearing section 26 and the surface of crank pin 12. Second, oil flows directly from oil well recess 54 through the associated oil hole 52 in upper bearing section 24 into an end of the oil receiving groove 41 formed in wall 35 of crank pin hole 16 of connecting rod 18. From groove 41 oil flows through passage 36 in rod 18 to oil receiving groove 43 in wristpin hole 11 and from thence to the space between wristpin bearing 15 and the surface of wristpin 13. Third, oil flows directly from the narrow end of oil well recess 54 into the space between the smooth inner surface 50 (the load bearing zone) of upper bearing section 24 and the confronting surface of crank pin 12 as a result of hydrodynamic lubrication, as hereinafter described.

As crank shaft 14 rotates and crank pin 12 proceeds along path PA on a compression stroke, the bearing assembly 10 retains its original position relative to the connecting rod 18. However, half-way through the compression stroke (as shown in phantom view in FIG. 1 and in FIG. 4), crank pin 12 has rotated (clockwise in FIG. 1) more than 90° relative to the bearing assembly 10 and the oil ports 51 at the ends of crank pin oil passage 40 are no longer in registry with the oil well recesses 54. However, one or the other oil port 51 will then always be in communication with groove 58 in lower bearing section 26 to thereby ensure that oil flows through groove 58 to both wells 54.

As will be understood, at the top of the compression stroke, crank pin 12 will have rotated 180° relative to bearing assembly 10 and the oil ports 51 will again be momentarily in registry with the oil well recesses 54 (although the ports will have reversed position). As will be further understood, in proceeding from the top of the compression stroke to the position shown in FIG. 1, the components will effect an intake stroke and crank pin 12 (and its oil ports 51) will return to the original position shown in FIG. 1 in solid lines. During the intake stroke, one port 51 will supply oil through groove 58 to the wells 54.

As crank pin 12 proceeds from the original position shown in FIG. 1 to the top of the compression stroke the following phenomena occur. First, crank pin 12 exerts a gradually increasing force against the oil present in the space between the surface of crank pin 12 and the load-bearing zone on inner surface 50 of upper bearing section 24. It is to be understood that there is no direct metal-to-metal contact between crank pin 12 and upper bearing section 24 because of the presence of oil. Second, as the force increases there is also relative motion between the outer surface of crank pin 12 (which is moving clockwise in FIG. 1) and the inner surface 50 of upper bearing section 24. As a result of this combination of pressure and motion, hydrodynamic lubrication occurs at the oil well recess 54 shown at the left side of FIG. 1. However, because of motion in this direction, hydrodynamic lubrication does not occur at the oil well recess 54 shown at the right side of FIG. 1.

As previously explained, during hydrodynamic lubrication, lubricant adheres to both the relatively stationary surface 50 and moving (rotating) surface of crank pin 12 and is dragged or drawn by molecular friction between the oil and moving crank pin surface into the rapidly narrowing clearance space in oil well recess 54 in the direction of motion, where it builds up a fluid pressure sufficient to carry the load.

Hydrodynamic lubrication is achieved by shaping the oil well recess 54 (at the left side of FIG. 1) so that it has a wedge-shaped cross-sectional configuration lengthwise which diminishes in depth or forms a converging wedge proceeding from an end of the bearing section 24 toward the central or load-bearing zone thereof. Lubricating oil, because of its molecular structure, exhibits "viscous drag" when it flows. Thus, oil is literally drawn into the converging wedge of the well from the shallowest end of left side oil well recess 54 and is dragged by the rotating shaft into the load-bearing zone of the bearing by "viscous drag", building up a pressure film with tremendous carrying power. Left side oil well recess 54 is preferably almost as wide as the bearing section 24 to ensure that sufficient oil enters the load-bearing zone and that it is spread evenly. Hydrodynamic lubrication is required because, as previously mentioned, the oil is supplied at a pressure of only about 40 psi to each oil well recess and this is insufficient to overcome the squeezing force of about 1000 psi that occurs between the upper bearing section 24 and the crank pin 12 during a compression stroke.

As will be understood, the oil in the right side oil well recess 54 is supplied therefrom as hereinbefore described to other parts of the system which are not subjected to such great forces. Oil in each oil well recess 54 is replenished continuously since one end port 51 or the other of oil feed passage 40 is in communication with groove 58 supplying oil to wells 54. Thus, an ample supply of oil is always available to lubricate the bearing and crank pin 12.

Unlike generally similar bearing assemblies used in four-cycle high-temperature internal combustion engines, the subject bearing assembly 10 is used in a relatively cool (300°) two-cycle refrigerator compressor and, therefore, the upper bearing half 24 is always subjected to a heavy compressive load on every upstroke (i.e. compression stroke). The heavily loaded smooth uninterrupted upper bearing surface 50 prevents formation of a wear groove in the surface of crank pin 12. The wells 54 on upper half 24 and groove 58 on lower half 26 enable use of heavier grade oil (300 viscosity) at higher pressure for "hydrodynamic lubrication".

Figure 9:
FIG. 9 is a graph or diagram showing the crank pin force and wear pattern produced on a crank pin during a compression stroke by an upper bearing section having no groove on its inner surface.
Figure 8:
FIG. 8 is a graph or diagram showing the crank pin force and wear pattern produced on a crank pin during a compression stroke by an upper bearing section having a single groove on its inner surface.
Figure 10:
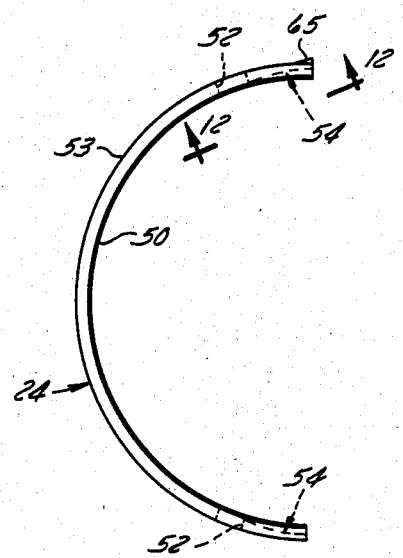
FIG. 10 is an elevation view of one edge of the upper bearing section.
Figure 11:
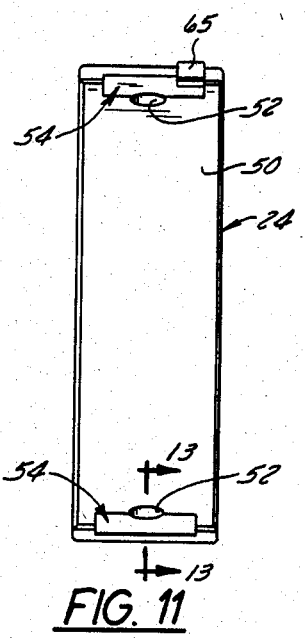
FIG. 11 is an elevation view of the inside surface of the upper bearing section.

Referring to FIGS. 8 and 9, it will be understood that in prior art arrangements in which an upper bearing section employed a groove, similar to the groove 58 in lower bearing section 26, the force and wear distribution pattern on a crank pin surface during an upstroke appears generally as shown in FIG. 8, i.e. two lobes of force with a center region of no force. This pattern of force distribution shown in FIG. 8 eventually resulted in a wear pattern of corresponding shape on a portion of surface of the crank pin 12. However, FIG. 9 shows the force distribution and wear pattern on crank pin 12 when using the ungrooved upper bearing section 24 and lubrication system in accordance with the present invention. The cross sectional area in FIGS. 8 and 9 is indicative of the load carrying capacity of the bearing. The area in FIG. 9 is larger than the area in FIG. 8.

I claim:

1. In combination:
a connecting rod comprising a crank pin hole having opposite sides and having a circumferentially extending oil groove formed in the side wall thereof along only one of said opposite sides, a wrist pin hole, and an oil passage communicating between said oil groove and said wrist pin hole;

a crank shaft comprising a crank pin disposed in said crank pin hole, said crank pin having at least one oil supply port at the outer surface thereof;

and a bearing means disposed in said crank pin hole and around said crank pin and comprising:

first and second bearing sections having smooth inner surfaces;

said first bearing section being located adjacent said one opposite side of said crank pin hole and having at least one oil well recess formed in said inner surface thereof for communicating with said oil supply port on said crank pin, said oil well recess having a wedge-shaped cross-sectional configuration with the narrower end of the wedge being adjacent a load-bearing zone between said first bearing section and said crank pin, said first bearing section also having at least one oil feed hole therethrough for communicating between said oil well recess and said oil groove in said crank pin hole side wall;

said second bearing section being located adjacent the other opposite side of said crank pin hole and having a circumferentially extending groove formed in said inner surface thereof with a groove end communicating with said oil well recess in said first bearing section and for communicating with said oil supply port on said crank pin;

said crank pin being movable during rotational movement of said crank shaft and reciprocating movement of said connecting rod to cause oil present in said oil well recess to be drawn therefrom by hydrodynamic lubrication into said load bearing zone between said first bearing section and said crank pin.

2. In combination:

a reciprocably movable connecting rod having a cylindrical crank pin hole defined by a wall and a wrist pin hole spaced apart therefrom, said crank pin hole having a circumferentially extending oil groove formed in one side of said wall nearest said wrist pin hole, said wall having an opposite side, said connecting rod further comprising an oil passage communicating between said oil groove and said wrist pin hole;

a rotatable crank shaft having a cylindrical crank pin disposed in said crank pin hole, said crank pin having a first axially extending oil flow passage and a transversly extending second oil flow passage communicating with said first oil flow passage, said second oil flow passage having circumferentially spaced apart oil supply ports at the outer surface of said crank pin;

and bearing means disposed in said crank pin hole and around said crank pin and comprising:

first and second semi-circular bearing sections disposed between said crank pin and said one side and said opposite side, respectively, of said wall of said crank pin hole in said connecting rod, each bearing section having a smooth inner surface; said first bearing section having oil well recesses formed at opposite ends in said inner surface thereof for communicating with said oil supply ports on said crank pin, said first bearing section also having oil feed holes therethrough near said opposite ends thereof for communicating between said oil supply ports and said oil groove in said wall of said crank pin hole;

and said second bearing section having a circumferentially extending groove formed in said smooth inner surface thereof with groove ends communicating with said oil well recesses in said first bearing section and for communicating with said oil supply ports on said crank pin;

said crank pin being movable during rotational movement of said crank shaft and reciprocating movement of said connecting rod to cause oil present in said oil well recesses to be drawn therefrom by hydrodynamic lubrication into a load bearing zone between said first bearing section and said crank pin.

3. A combination according to claim 1 or 2 wherein said first and second bearing sections are discrete separable components.

4. A combination according to claim 3 wherein each bearing section comprises a projection for engaging a recess in said connecting rod located adjacent said crank pin hole to prevent relative rotation of said bearing section in said crank pin hole.

5. A combination according to claim 4 wherein at least one of said oil well recesses has a wedge-shaped cross-sectional configuration with the narrower end of the wedge being adjacent said load-bearing zone between said first bearing section and said crank pin.

* * * * *